July 1, 1930. I. YOKOTA 1,769,816
LEAKAGE FLUX SHIELD FOR DYNAMO ELECTRIC MACHINES
Filed March 16, 1929
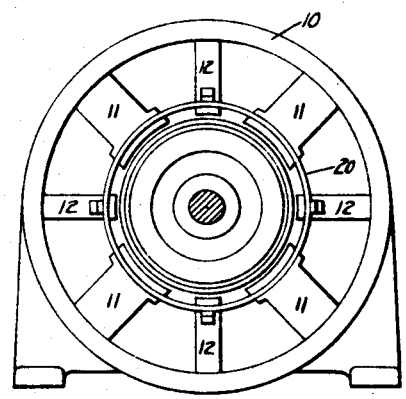
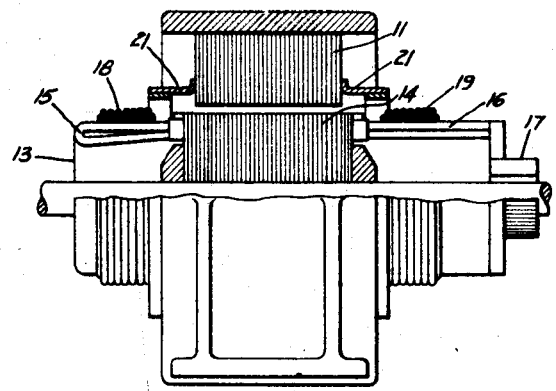
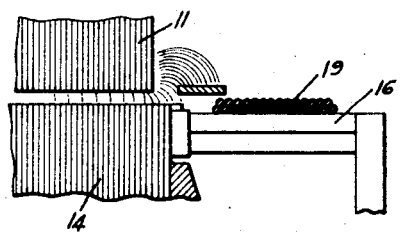
Inventor:
Isao Yokota,
by Charles E. Tullar
His Attorney.

Patented July 1, 1930

1,769,816

UNITED STATES PATENT OFFICE

ISAO YOKOTA, OF TOKYO, JAPAN, ASSIGNOR TO GENERAL ELECTRIC COMPANY, A CORPORATION OF NEW YORK

LEAKAGE-FLUX SHIELD FOR DYNAMO-ELECTRIC MACHINES

Application filed March 16, 1929, Serial No. 347,613, and in Japan August 3, 1928.

My invention relates to leakage flux shielding devices for dynamo electric machines having binding bands on the end connections of the windings on the rotatable member thereof.

The end connections of the windings on the rotatable member of dynamo electric machines are usually retained in place against the action of centrifugal force by the use of binding bands. As this force is quite large, particularly in high speed machines, the bands are ordinarily made of steel wire or steel rings to withstand the stresses to which they are subjected during operation of the machine. The stray flux from the stationary member of the machine enters the binding bands and induces large eddy currents therein causing heating, which is objectionable because it decreases the capacity of the machine and because heating of the binding band is likely to cause the same to be displaced and damage the machine.

The object of my invention, therefore, is to prevent leakage flux from the stationary members of dynamo electric machines entering the binding bands thereof so as to avoid objectionable heating therein due to eddy currents. I accomplish this by arranging a stationary shield adjacent the binding bands on the rotatable members which prevents leakage flux from one of the members entering the other.

My invention will be more fully set forth in the following description, referring to the accompanying drawing, and the features of novelty which characterize my invention will be pointed out with particularity in the claims annexed to and forming a part of this specification.

In the drawing Fig. 1 is an end view of a dynamo electric machine embodying my invention, the end head or bearing support being removed to more clearly show the construction; Fig. 2 is a side elevation of the structure shown in Fig. 1 partly broken away, and Fig. 3 is a fragmentary longitudinal sectional view of the machine showing how my improved shield prevents leakage flux from the stationary member of the machine entering the binding band.

I have shown my invention in connection with a dynamo electric machine having a stationary member 10 provided with salient main poles 11 and interpoles 12 having suitable exciting windings, not shown, and provided with a rotatable member or armature 13. The armature is provided with the usual winding arranged on the core structure 14 having end connections 15 and 16 extending beyond the ends thereof, the end connections 16 being connected to the commutator 17 in the usual manner. The end connections 15 and 16 are retained in place against the action of centrifugal force by binding bands 18 and 19 which, in this instance, are made of steel wire secured in place in any suitable manner, as by soldering.

If the leakage flux from the sides of the poles 11 and 12 is permitted to pass into the binding bands 18, 19 the resultant eddy currents cause objectionable heating and, in some instances, might melt the solder retaining the wires in place so as to loosen them and thereby damage the machine.

In accordance with my invention, therefore, I provide shields which prevent the leakage flux from the poles of the machine entering the binding bands. In the present embodiment of my invention, I do this by arranging stationary annular shields 20 of magnetic material, which are supported on the poles of the machine by brackets 21 secured thereto, and which have the sides thereof presented toward the rotatable member of the machine. The shields 20 are preferably arranged between the sides of the pole pieces of the machine and the adjacent edge of the binding bands 18 and 19, so that the leakage flux from the sides of the poles enters the shield, as shown in Fig. 3, and passes to the adjacent pole, instead of entering the binding band in passing thereto. In this way the difficulties previously experienced from heating of the binding bands due to leakage flux is avoided.

Although I have shown my invention in connection with a direct current dynamo-electric machine of the salient pole type, I do not desire my invention to be limited in its application to a machine of this type, nor do I desire my invention to be limited to the use of a shield of the particular form or material which I have specified, as it is apparent that my invention is applicable to other types of machines, and that the shield may be of other forms and may be made, in some instances, of material other than magnetic material. I intend, therefore, to cover in the appended claims all modifications which do not depart from the spirit and scope of my invention.

What I claim as new and desire to secure by Letters Patent of the United States is:

1. A dynamo-electric machine comprising a stationary member and a rotatable member, said rotatable member having a binding band of magnetic material for retaining the windings thereof in place, and means including a stationary shield arranged adjacent said binding band for preventing leakage flux from one of said members entering the other.

2. A dynamo-electric machine comprising a stationary member and a rotatable member, said rotatable member having a binding band of magnetic material for retaining the windings thereof in place, and means including a stationary curved shield having the side thereof presented toward said rotatable member and arranged adjacent said binding band for preventing leakage flux from said stationary member entering said binding band.

3. A dynamo-electric machine comprising a stationary member and a rotatable member, said rotatable member having a binding band of magnetic material for retaining the windings thereof in place, and means including an annular stationary shield surrounding said rotatable member between said stationary member and said binding band for preventing flux from the former entering the latter.

4. A dynamo-electric machine comprising a stationary member having salient poles and a rotatable armature, said armature having a binding band of magnetic material for retaining the windings thereof in place, and means including an annular stationary shield of magnetic material surrounding said armature between said poles and said binding band for preventing flux from the former entering the latter.

5. A dynamo-electric machine comprising a stationary member having salient poles and a rotatable armature, said armature having a binding band of magnetic material for retaining the windings thereof in place, means including an annular stationary shield of magnetic material surrounding said armature between said poles and said binding band for preventing flux from the former entering the latter, and means for supporting said annular shield on said poles.

In witness whereof, I have hereunto set my hand, this twenty-first day of February, 1929.

ISAO YOKOTA.